US012662351B2

(12) United States Patent
Deng et al.

(10) Patent No.: US 12,662,351 B2
(45) Date of Patent: Jun. 23, 2026

(54) SYSTEM AND METHOD OF ENABLING A MOBILE ROBOT TO TAKE AN ELEVATOR AUTONOMOUSLY

(71) Applicants: Tyco Electronics (Shanghai) Co. Ltd., Shanghai (CN); TE Connectivity Services GmbH, Schaffhausen (CH); Kunshan League Automechanism Co., Ltd., Kunshan City (CN)

(72) Inventors: Yingcong Deng, Shanghai (CN); Dandan Zhang, Shanghai (CN); Roberto Francisco-Yi Lu, Bellevue, WA (US); Fengchun Xie, Shanghai (CN); Mingyang Weng, Kunshan City (CN)

(73) Assignees: TE Connectivity Solutions GmbH, Schaffhausen (CH); Tyco Electronics (Shanghai) Co., Ltd., Shanghai (CN); Kunshan League Automechanism Co., Ltd., Kunshan City (CN)

( * ) Notice: Subject to any disclaimer, the term of this patent is extended or adjusted under 35 U.S.C. 154(b) by 1379 days.

(21) Appl. No.: 17/335,380

(22) Filed: Jun. 1, 2021

(65) Prior Publication Data

US 2021/0371236 A1 Dec. 2, 2021

(30) Foreign Application Priority Data

Jun. 1, 2020 (CN) ........................ 202010484087.X

(51) Int. Cl.
  B66B 1/46 (2006.01)
  B66B 1/24 (2006.01)
  (Continued)

(52) U.S. Cl.
  CPC ............ B66B 1/468 (2013.01); B66B 1/2408 (2013.01); B66B 1/2458 (2013.01);
  (Continued)

(58) Field of Classification Search
  CPC . B66B 1/468; B66B 1/3461; B66B 2201/102; B66B 2201/4623;
  (Continued)

(56) References Cited

U.S. PATENT DOCUMENTS 10,857,679 B1 * 12/2020 Cousins ............... G05D 1/0246
12,162,724 B2 * 12/2024 Roth ....................... B66B 1/463
  (Continued)

FOREIGN PATENT DOCUMENTS

CN 102020220 A 4/2011
CN 202175534 U 3/2012
  (Continued)

OTHER PUBLICATIONS

Chinese Third Office Action dated Aug. 17, 2023 with English translation, corresponding to Application No. 202010484087.X, 16 pages.
  (Continued)

*Primary Examiner* — Lawrence Averick
(74) *Attorney, Agent, or Firm* — Barley Snyder

(57) ABSTRACT

A system for enabling a mobile robot to utilize an elevator autonomously comprises a pressing module including at least one pressing finger adapted to press elevator call buttons on an elevator call control panel. A lifting device of the system supports the pressing module and selectively adjusts a height position of the pressing module for aligning the at least one pressing finger on the pressing module to height positions horizontally aligned with the elevator call buttons. A controller wirelessly communicates with the mobile robot and the pressing module. In response to a command sent by the mobile robot, the controller instructs the pressing module to press an elevator call button on the elevator call control panel associated with the command.

20 Claims, 5 Drawing Sheets

(51) Int. Cl.

| | |
|---|---|
| *B66B 1/34* | (2006.01) |
| *B66B 11/02* | (2006.01) |
| *F16M 11/28* | (2006.01) |
| *G05G 1/54* | (2008.04) |

(52) U.S. Cl.
CPC ............ *B66B 1/3461* (2013.01); *B66B 1/462* (2013.01); *B66B 11/0206* (2013.01); *G05G 1/54* (2013.01); *B66B 2201/102* (2013.01); *B66B 2201/4623* (2013.01); *B66B 2201/463* (2013.01); *B66B 2201/4653* (2013.01); *F16M 11/28* (2013.01); *F16M 2200/08* (2013.01)

(58) Field of Classification Search
CPC ...... B66B 2201/463; B66B 2201/4653; B66B 13/14; G05G 1/54; F16M 11/28; F16M 2200/08; B25J 11/00; B25J 9/0003
See application file for complete search history.

(56) References Cited

U.S. PATENT DOCUMENTS

| | | | |
|---|---|---|---|
| 12,353,215 B2 * | 7/2025 | Sternitzke ............ | G05D 1/0225 |
| 2016/0167222 A1 * | 6/2016 | Ead .......................... | B25J 9/104 |
| | | | 700/257 |
| 2019/0248014 A1 * | 8/2019 | Deyle .................... | B25J 13/006 |
| 2020/0290843 A1 * | 9/2020 | Deng ...................... | B66B 1/468 |
| 2020/0398436 A1 * | 12/2020 | Cousins ................. | B25J 11/008 |
| 2021/0206598 A1 * | 7/2021 | Roth ........................ | B66B 1/468 |
| 2022/0017332 A1 * | 1/2022 | Kim ......................... | B66B 13/14 |
| 2023/0039466 A1 * | 2/2023 | Sternitzke ................ | G06T 7/70 |

FOREIGN PATENT DOCUMENTS

| | | | |
|---|---|---|---|
| CN | 202749281 U | 2/2013 |
| CN | 104030191 A | 9/2014 |
| CN | 105110107 A | 12/2015 |
| CN | 205575466 U | 9/2016 |
| CN | 205802697 U | 12/2016 |
| CN | 205852772 U | 1/2017 |
| CN | 206384675 U | 8/2017 |
| CN | 107393204 A | 11/2017 |
| CN | 108297061 A | 7/2018 |
| CN | 109760058 A | 5/2019 |
| CN | 209352506 U | 9/2019 |
| CN | 210048311 U | 2/2020 |
| CN | 110902515 A | 3/2020 |
| CN | 111099462 A | 5/2020 |
| JP | 2017001852 A | 1/2017 |
| KR | 20110022139 A | 3/2011 |
| WO | 2018167152 A1 | 9/2018 |

OTHER PUBLICATIONS

Chinese Office Action dated Dec. 19, 2023 with English translation, corresponding to Application No. 202010484087.X, 21 pages.
First Office Action from the CNIPA dated Oct. 8, 2022, corresponding to Application No. 202010484087.X with an English translation, 21 pages.
2 Second Office Action from the Danish Patent and Trademark Office dated Oct. 24, 2022, 3 pages.
Chinese Second Office Action dated May 11, 2023, with English translation thereof, corresponding to Application No. 202010484087. X, 20 pages.

* cited by examiner

SYSTEM AND METHOD OF ENABLING A MOBILE ROBOT TO TAKE AN ELEVATOR AUTONOMOUSLY

CROSS-REFERENCE TO RELATED APPLICATIONS

This application claims priority under 35 U.S.C. § 119 to Chinese Patent Application No. 202010484087.X, filed on Jun. 1, 2020, the entire disclosure of which is incorporated herein by reference.

FIELD OF THE INVENTION

The present disclosure relates to a system for enabling a mobile robot to autonomously utilize an elevator.

BACKGROUND

Elevator systems are widely used to improve vertical mobility between, for example, floors of a building. In order to ensure the safety of the elevator, a third party is typically prevented from accessing elevator controls or otherwise alter the operation of the elevator. Thus, in the prior arts, a mobile robot cannot control an elevator by communicating directly with a control system of the elevator. As a result, the mobile robot can typically only move or operate on a given floor, and cannot move to another floor utilizing the elevator autonomously. If the mobile robot is required to move to another floor, an operator must manually operate the elevator to transport it to the destination floor, limiting the application of the robot and/or complicating its operation.

SUMMARY

According to an embodiment of the present disclosure, a system for enabling a mobile robot to utilize an elevator autonomously is provided. The system comprises a pressing module including at least one pressing finger for pressing elevator call buttons on an elevator call control panel. A lifting device of the system supports the pressing module and selectively adjusts a height position of the pressing module for aligning the at least one pressing finger on the pressing module to height positions horizontally aligned with the elevator call buttons. A controller wirelessly communicates with the mobile robot and the pressing module. In response to a command sent by the mobile robot, the controller instructs the pressing module to press an elevator call button on the elevator call control panel associated with the command.

BRIEF DESCRIPTION OF THE DRAWINGS

The invention will now be described by way of example with reference to the accompanying Figures, of which.

DETAILED DESCRIPTION OF THE EMBODIMENTS

Figure 1:
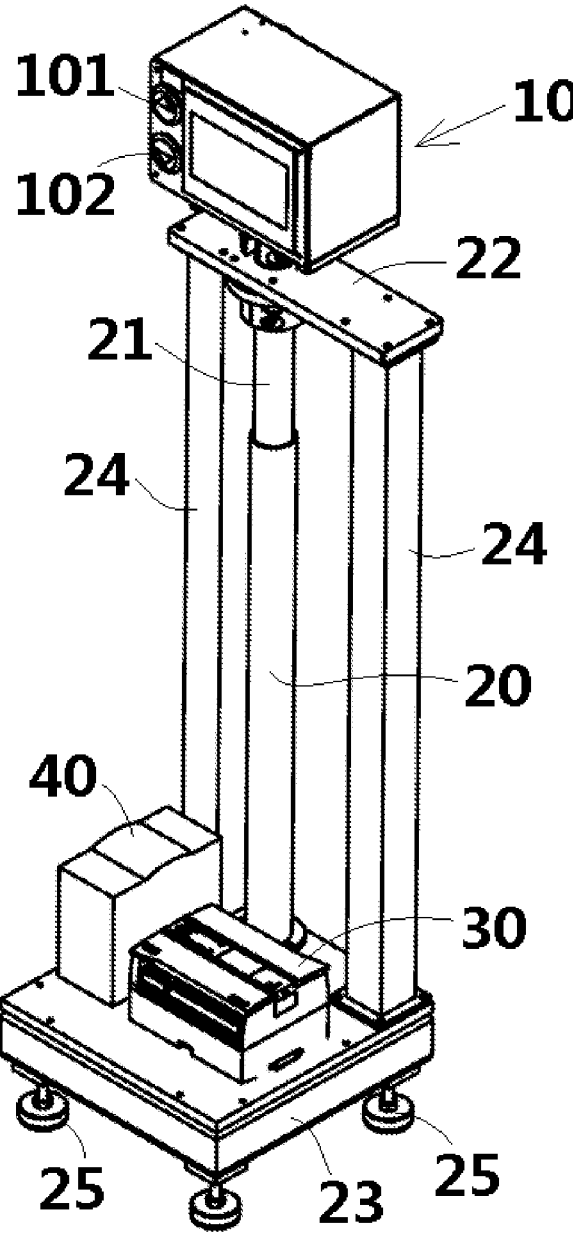
FIG. 1 shows a schematic perspective view of a system for enabling a mobile robot to take an elevator autonomously according to an exemplary embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure, a system for enabling a mobile robot to utilize an elevator autonomously comprises a pressing module including pressing fingers adapted to press elevator call buttons on an elevator call control panel at a floor. A lifting device of the system supports the pressing module and selectively adjusts a height position of the pressing module. The system further includes a controller adapted to wirelessly communicate with the mobile robot and the pressing module. The lifting device is adapted to adjust the pressing fingers on the pressing module to a height position horizontally aligned with the elevator call buttons, and the controller is adapted to control or instruct the pressing module to press the corresponding elevator call buttons on the elevator call control panel according to a command sent by the mobile robot.

Figure 2:
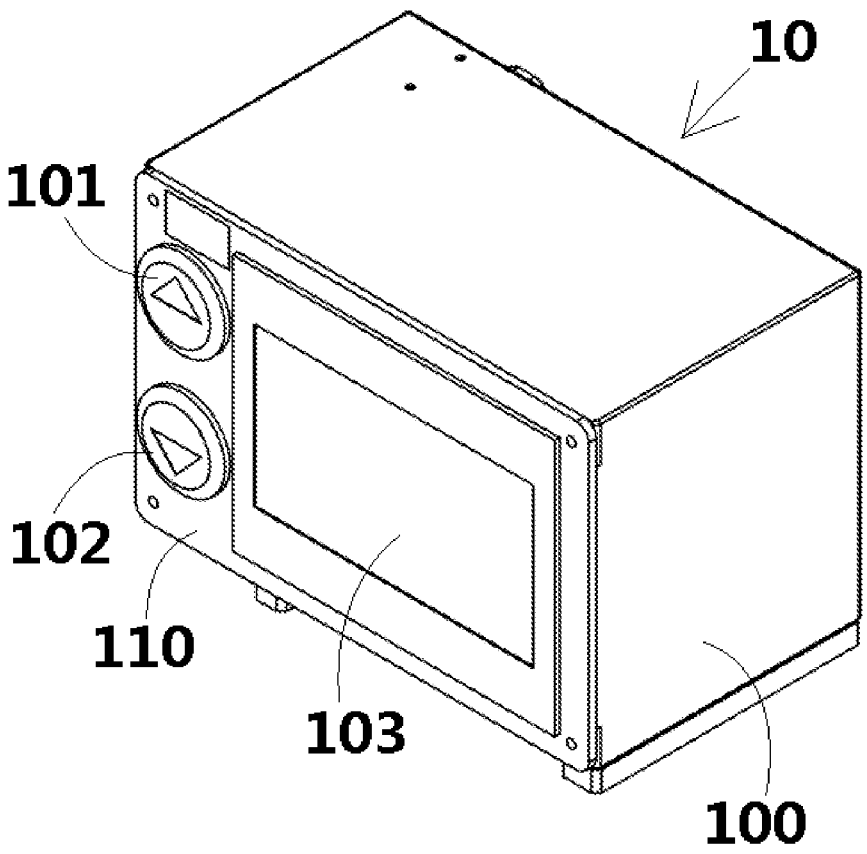
FIG. 2 shows a schematic perspective view of a pressing module viewed from the front according to an exemplary embodiment of the present disclosure.
Figure 3:
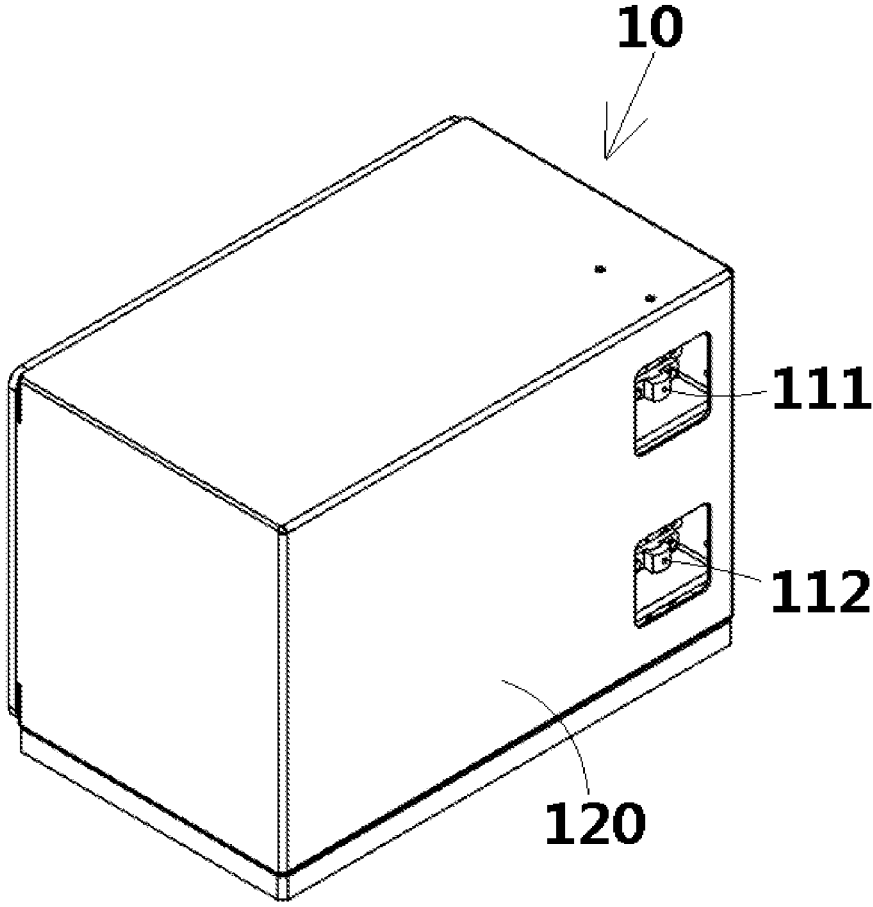
FIG. 3 shows a schematic perspective view of a pressing module viewed from the back according to an exemplary embodiment of the present disclosure.

FIG. 1 shows a schematic perspective view of a system for enabling a mobile robot to operate an elevator autonomously according to an exemplary embodiment of the present disclosure. FIG. 2 shows a schematic perspective view of a pressing module 10 viewed from the front according to an exemplary embodiment of the present disclosure. FIG. 3 shows a schematic perspective view of a pressing module 10 viewed from the back according to an exemplary embodiment of the present disclosure.

As shown in FIGS. 1 to 3, the system for enabling a mobile robot to utilize an elevator autonomously comprises a pressing module 10, a lifting device 20 and a controller 30. The pressing module 10 comprises pressing fingers 111, 112 adapted to press elevator call buttons 2a, 2b on an elevator call control panel 2 at a floor. The lifting device 20 is adapted to support the pressing module 10 and adjust a height position of the pressing module 10. The controller 30 is adapted to wirelessly communicate with the mobile robot 1 and the pressing module 10.

Figure 4:
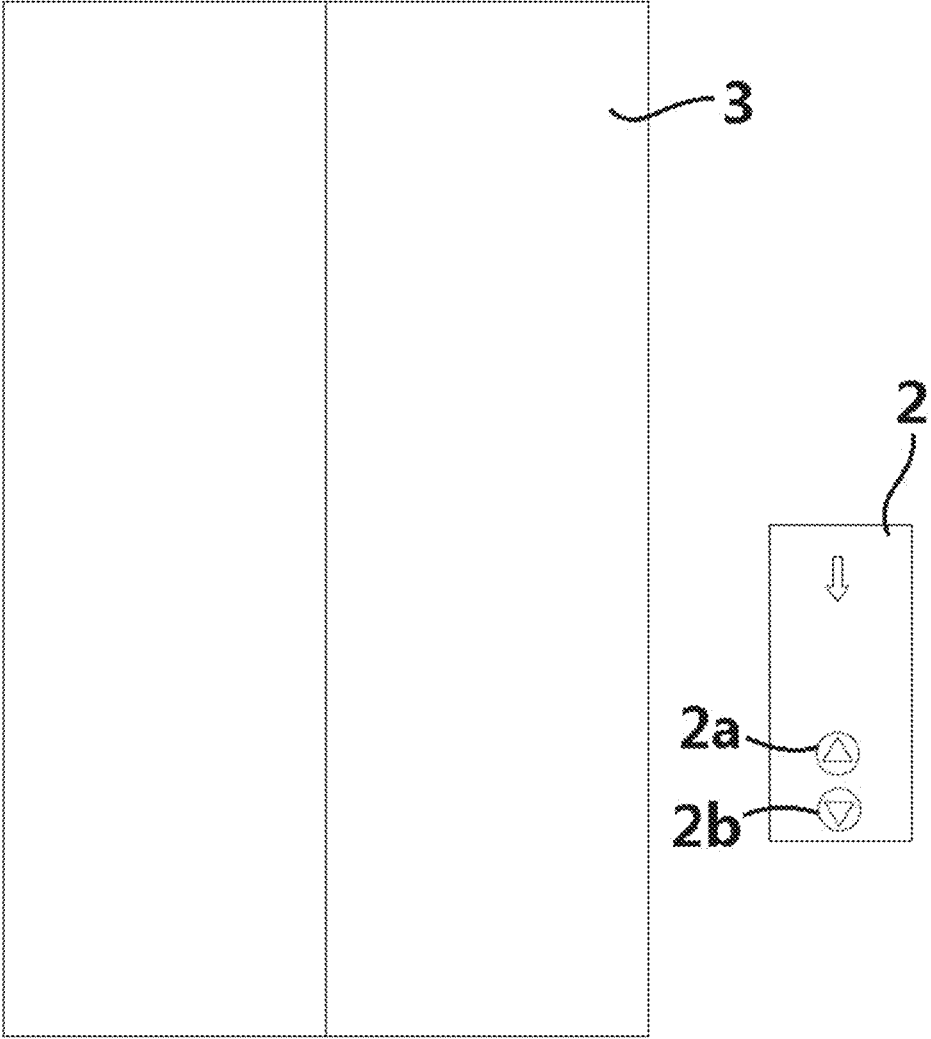
FIG. 4 shows a schematic view of a floor and an elevator call control panel mounted beside an elevator hall door on the floor according to an exemplary embodiment of the present disclosure.
Figure 5:
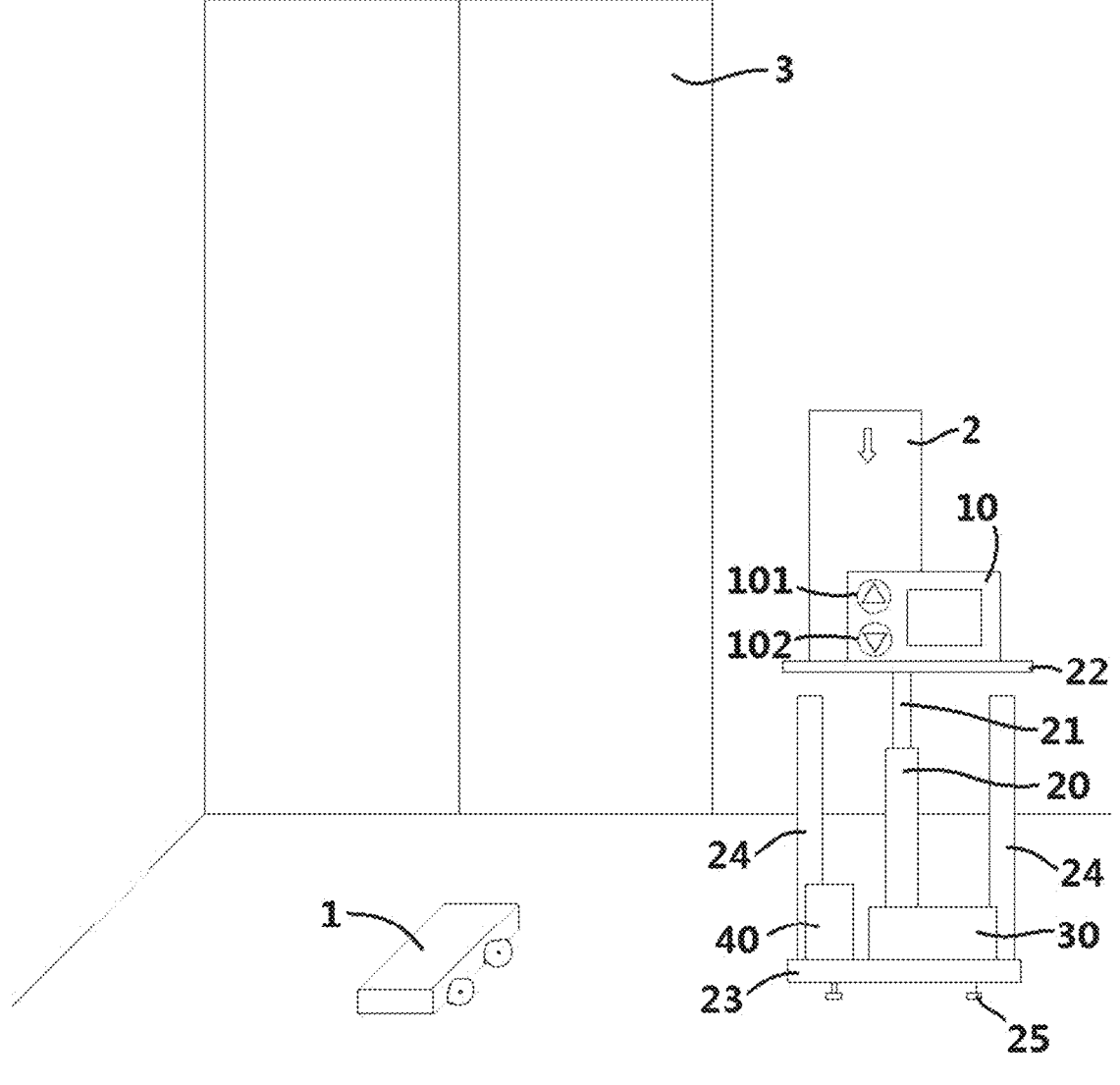
FIG. 5 shows a schematic view of an elevator call button being pressed by a mobile robot via the system for enabling a mobile robot to take an elevator autonomously shown in FIG. 1.

FIG. 4 shows a schematic view of a floor and an elevator call control panel mounted beside an elevator hall door 3 on the floor according to an exemplary embodiment of the present disclosure. FIG. 5 shows a schematic view of an elevator call button (2a, 2b) being pressed by the mobile robot 1 using the system of FIG. 1.

In the illustrated embodiment, as shown in FIGS. 1 to 5, the lifting device 20 is adapted to adjust the pressing fingers 111, 112 on the pressing module 10 to height positions horizontally aligned with the elevator call buttons 2a, 2b. The controller 30 is adapted to control the pressing module 10 to press the corresponding elevator call button 2a, 2b on the elevator call control panel 2 according to a command sent by the mobile robot 1.

As shown in FIGS. 1-5, the pressing module 10 also comprises a housing 100. The pressing fingers 111, 112 are provided in the housing 100 and selectively extend out of the housing 100 to press the elevator call buttons 2a, 2b.

In the illustrated embodiment, as shown in FIGS. 1 to 5, a rear surface 120 of the housing 100 facing the elevator call control panel 2 is formed with openings allowing the pressing fingers 111, 112 to extend out from the rear surface 120 of the housing 100 and through the openings.

In the illustrated embodiment, as shown in FIGS. 1 to 5, the pressing module 10 further comprises a driving mechanism provided in the housing 100 and adapted to drive the pressing fingers 111, 112 to extend out of the housing 100 under the control of the controller 30. In one embodiment, the pressing fingers 111, 112 define part of the driving mechanism, and more specifically, each pressing finger 111, 112 defines a moveable free end of the driving mechanism.

In the illustrated embodiment, as shown in FIGS. 1 to 5, the driving mechanism is further adapted to drive the pressing fingers 111, 112 to retract into the housing 100 after the pressing fingers 111, 112 complete the pressing action. However, in other embodiments, the pressing fingers 111, 112 may automatically retract into the housing 100 by virtue of an elastic reset mechanism provided in the housing 100 after completing the pressing action.

In the illustrated embodiment, as shown in FIGS. 1 to 5, the pressing module 10 also comprises pressing buttons 101, 102 provided on a front surface 110 of the housing 100 facing away from the elevator call control panel 2. When the pressing button 101 or 102 is pressed, the driving mechanism drives the pressing finger 111 or 112 to press the elevator call button 2a or 2b on the elevator call control panel 2 corresponding to the pressed pressing button 101 or 102. In this way, a passenger may call the elevator manually by pressing the pressing buttons 101, 102, without interfering with the normal operation of the elevator.

In the illustrated embodiment, as shown in FIGS. 1 to 5, the pressing module 10 further comprises a human-machine interaction interface 103 provided on the front surface 110 of the housing 100 and adapted to display working information of the pressing module 10.

In the illustrated embodiment, as shown in FIGS. 1 to 5, the elevator call buttons include an up button 2a and a down button 2b provided on the elevator call control panel 2. The pressing fingers include a first pressing finger 111 for pressing the up button 2a and a second pressing finger 112 for pressing the down button 2b.

In the illustrated embodiment, as shown in FIGS. 1 to 5, when the mobile robot 1 sends a command to press the up button 2a, the pressing module 10 or the driving mechanism drives the first pressing finger 111 to press the up button 2a under the control of the controller 30. When the mobile robot 1 sends a command to press the down button 2b, the pressing module 10 or the driving mechanism drives the second pressing finger 112 to press the down button 2b under the control of the controller 30.

In the illustrated embodiment, as shown in FIGS. 1 to 5, the pressing buttons 101, 102 include a first pressing button 101 corresponding to the up button 2a and a second pressing button 102 corresponding to the down button 2b.

In the illustrated embodiment, as shown in FIGS. 1 to 5, when the first pressing button 101 is pressed, the pressing module 10 or the driving mechanism drives the first pressing finger 111 to press the up button 2a, and when the second pressing button 102 is pressed, the pressing module 10 or the driving mechanism drives the second pressing finger 112 to press the down button 2b.

In the illustrated embodiment, as shown in FIGS. 1 to 5, the lifting device 20 comprises a liftable telescopic rod 21, and the pressing module 10 is supported on a top end of the telescopic rod 21.

In an exemplary embodiment, as shown in FIGS. 1 to 5, the lifting device 20 also comprises a support plate 2b fixed on the top end of the telescopic rod 2a, and the pressing module 10 is fixed on the support plate 2b.

In the illustrated embodiment, as shown in FIGS. 1 to 5, the system for enabling a mobile robot to take an elevator autonomously further comprises a base 23, and the lifting device 20 and the controller 30 are mounted on the base 23.

In the illustrated embodiment, as shown in FIGS. 1 to 5, the lifting device 20 is an electronically controlled hydraulic cylinder or an electronically controlled cylinder, and the controller 30 is also adapted to control an ascending or descending distance of the lifting device 20 so as to adjust the height position of the pressing module 10.

In the illustrated embodiment, as shown in FIGS. 1 to 5, the system for enabling a mobile robot to take an elevator autonomously further comprises a power source 40 mounted on the base 23, and the power source 40 is adapt to supply power to the pressing module 10, the lifting device 20 and the controller 30.

In the illustrated embodiment, as shown in FIGS. 1 to 5, the system for the mobile robot to take the elevator autonomously also comprises a pair of fixed support columns 24 fixed on the base 23, and respectively located below the two ends of the support plate 22 and configured to support the supporting plate 22 at a predetermined height position.

In the illustrated embodiment, as shown in FIGS. 1 to 5, the lifting device 20 is provided between the pair of fixed support columns 24 and located below a middle position of the support plate 22.

In the illustrated embodiment, as shown in FIGS. 1 to 5, the system for the mobile robot to take the elevator autonomously further comprises supporting feet 25 connected to a bottom of the base 23 and configured for supporting the base 23.

In the illustrated embodiment, as shown in FIGS. 1 to 5, a distance between the first pressing finger 111 and the second pressing finger 112 is adjustable to accommodate different elevator call control panels 2. The distances between the elevator call buttons 2a, 2b on the different elevator call control panels 2 may be different.

In the illustrated embodiment, as shown in FIGS. 1 to 5, the mobile robot 1 may be an Automatic Guided Vehicle (AGV).

In another embodiment of the present disclosure, as shown in FIGS. 1 to 5, a method for enabling a mobile robot to take an elevator autonomously, comprises the following steps:

S100: one above-described system for enabling a mobile robot to take an elevator autonomously is provided in front of the elevator call control panel 2 at each floor;

S200: the mobile robot 1 sends, to the system at a departure floor, a command to press the elevator call button 2a, 2b through wireless communication;

S300: the system at the departure floor presses the corresponding elevator call button 2a, 2b according to the command sent by the mobile robot 1;

S400: the mobile robot 1 enters an elevator car after an elevator hall door 3 at the departure floor is opened;

S500: after entering the elevator car, the mobile robot 1 sends a command to press the elevator call button 2a, 2b to the system at a target floor to be headed;

S600: the system at the target floor presses the corresponding elevator call button 2a, 2b according to the command sent by the mobile robot 1;

S700: after the elevator car reaches the target floor and the elevator hall door of the target floor is opened, the mobile robot 1 leaves the elevator.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A system for enabling a mobile robot to utilize an elevator autonomously, comprising:
   a pressing module including a housing having a plurality of pressing fingers provided within the housing for pressing elevator call buttons on an elevator call control panel, the plurality of pressing fingers selectively extend and/or retract in and out of the housing to press the elevator call buttons;
   a lifting device supporting the housing of the pressing module and selectively adjusting a height position of the pressing module for aligning at least one pressing finger of the plurality of pressing fingers on the pressing module to height positions horizontally aligned with the elevator call buttons; and
   a controller for wirelessly communicating with the mobile robot and the pressing module, the controller, in response to a command sent by the mobile robot, controlling the pressing module to press an elevator call button on the elevator call control panel associated with the command.

2. The system according to claim 1, wherein the pressing module automatically retracts at least one of the plurality of pressing fingers into the housing under the action of an elastic reset mechanism after completing the pressing action.

3. The system according to claim 1, wherein a rear surface of the housing facing the elevator call control panel includes a plurality of openings through which the plurality of pressing fingers pass as they extend out of the housing to press the elevator call buttons.

4. The system according to claim 1, wherein the pressing module further comprises a plurality of pressing buttons provided on a front surface of the housing facing away from the elevator call control panel, the pressing module, in response to one of the pressing buttons being pressed, driving the at least one pressing finger to press the elevator call button of the elevator call control panel corresponding to the pressed pressing button.

5. The system according to claim 4, wherein the pressing module further comprises a human-machine interaction interface provided on the front surface of the housing for displaying working information of the pressing module.

6. The system according to claim 4, wherein the elevator call buttons include an up button and a down button provided on the elevator call control panel, and the at least one pressing finger includes a first pressing finger for pressing the up button and a second pressing finger for pressing the down button.

7. The system according to claim 6, wherein the pressing module is adapted to, in response to the mobile robot sending a command to press the up button, drive the first pressing finger to press the up button under control of the controller, the pressing module is further adapted to, in response to the mobile robot sending a command to press the down button, drive the second pressing finger to press the down button under control of the controller.

8. The system according to claim 7, wherein the pressing buttons comprise a first pressing button corresponding to the up button and a second pressing button corresponding to the down button.

9. The system according to claim 8, wherein the pressing module is further adapted to, in response to the first pressing button being pressed, drive the first pressing finger to press the up button, and in response to the second pressing button being pressed, drive the second pressing finger to press the down button.

10. The system according to claim 6, wherein a distance between the first pressing finger and the second pressing finger is adjustable to accommodate different elevator call control panels.

11. The system according to claim 1, wherein the lifting device includes a liftable telescopic rod supporting the pressing module on an end thereof.

12. The system according to claim 11, wherein the lifting device further includes a support plate fixed on the top end of the telescopic rod, and the pressing module is fixed on the support plate.

13. The system according to claim 12, wherein the system further includes a base, and the lifting device and the controller are mounted on the base.

14. The system according to claim 13, wherein the lifting device is an electronically controlled hydraulic cylinder or an electronically controlled cylinder, and the controller is further adapted to control an ascending or descending distance of the lifting device so as to adjust the height position of the pressing module.

15. The system according to claim 13, wherein the system further comprises a pair of fixed support columns fixed on the base, the pair of fixed support columns being located below two ends of the support plate respectively for supporting the supporting plate at a predetermined height position.

16. The system according to claim 15, wherein the lifting device is provided between the pair of fixed support columns and located below a middle position of the support plate.

17. The system according to claim 1, wherein the pressing module further comprises a driving mechanism provided within the housing and adapted to drive the plurality of pressing fingers, each pressing finger defines a moveable free end of the driving mechanism.

18. A system for enabling a mobile robot to take an elevator autonomously, comprising:

a plurality of autonomous elevator systems, each system positioned in front of an elevator call control panel at a plurality of floors accessible by an elevator car of the elevator, each system comprising:

a pressing module including a pressing finger adapted to press elevator call buttons on an elevator call control panel;

a lifting device supporting the pressing module for selectively adjusting a height position of the pressing module for aligning the pressing finger on the pressing module to height positions horizontally aligned with the elevator call buttons; and a controller adapted to wirelessly communicate with the mobile robot and the pressing module, the controller, in response to a command sent by the mobile robot, controlling the pressing module to press predetermined elevator call buttons on the elevator call control panel, the mobile robot sends a first command to press an elevator call button to one of the plurality of autonomous elevator systems positioned on a departure floor, and upon entering the elevator car at the departure floor, sends a second command to press an elevator call button to another one of the plurality of autonomous elevator systems positioned on a destination floor for moving the elevator car to the destination floor.

19. A system for enabling a mobile robot to utilize an elevator autonomously, comprising:

a pressing module including at least one pressing finger for pressing elevator call buttons on an elevator call control panel;

a lifting device supporting the pressing module and selectively adjusting a height position of the pressing module for aligning the at least one pressing finger on the pressing module to height positions horizontally aligned with the elevator call buttons, the lifting device includes a liftable telescopic rod supporting the pressing module on an end thereof and a support plate fixed on a top end of the telescopic rod, the pressing module is fixed on the support plate;

a controller for wirelessly communicating with the mobile robot and the pressing module, the controller, in response to a command sent by the mobile robot, controlling the pressing module to press an elevator call button on the elevator call control panel associated with the command;

a base on which the lifting device and the controller are mounted; and a pair of fixed support columns fixed on the base, the pair of fixed support columns being located below two ends of the support plate respectively for supporting the supporting plate at a predetermined height position.

20. The system according to claim 19, wherein the lifting device is provided between the pair of fixed support columns and located below a middle position of the support plate.

* * * * *